United States Patent [19]

Carbonaro et al.

[11] 4,444,903

[45] Apr. 24, 1984

[54] PROCESS FOR POLYMERIZING CONJUGATE DIOLEFINS, AND MEANS SUITABLE FOR THIS PURPOSE

[75] Inventors: Antonio Carbonaro, Milan; Domenico Ferraro; Mario Bruzzone, both of S.Donato Milanese, all of Italy

[73] Assignee: Enoxy Chimica, S.p.A., Sassari, Italy

[21] Appl. No.: 413,982

[22] Filed: Sep. 2, 1982

[30] Foreign Application Priority Data

Sep. 25, 1981 [IT] Italy ................................ 24160 A/81

[51] Int. Cl.$^3$ ................................................ C08F 4/62
[52] U.S. Cl. .................................... 502/102; 502/154; 526/143; 526/144
[58] Field of Search ........... 252/429 B, 431 R, 431 C; 502/102, 154

[56] References Cited

U.S. PATENT DOCUMENTS

| | | | |
|---|---|---|---|
| 3,655,811 | 4/1972 | Yoo | 252/429 B X |
| 3,676,411 | 7/1972 | Throckmorton et al. | 252/431 C X |
| 3,803,053 | 4/1974 | Yoo et al. | 252/431 C X |
| 4,152,295 | 5/1979 | Stapp | 252/431 C X |
| 4,242,232 | 12/1980 | Sylvester et al. | 252/429 B X |

Primary Examiner—Patrick Garvin
Attorney, Agent, or Firm—Morgan, Finnegan, Pine, Foley & Lee

[57] ABSTRACT

An improved process is described for preparing conjugate diolefin polymers or copolymers having a high content of 1,4-cis units and high chain linearity, the process using a particular catalytic system prepared from a compound of a metal chosen from those of Group III B of the Periodic System which have an atomic number of between 21 and 103, preferably neodymium, an organic halogen derivative, and an aluminium alkylhydride or trialkyl.

7 Claims, No Drawings

PROCESS FOR POLYMERIZING CONJUGATE DIOLEFINS, AND MEANS SUITABLE FOR THIS PURPOSE

This invention relates to a new catalytic system and its use in the polymerisation or copolymerisation of conjugate diolefins to produce polymers having preferably a high content of 1,4-cis units and high chain linearity.

Conjugate diolefin polymers can be obtained using catalysts based on rare earth metal compounds.

For example, the U.S. Ser. No. 928,552 filed on July 27, 1978 and now abandoned describes the use of a lanthanide metal chelate with a monovalent or monodentate organic binder for producing polybutadiene having a high 1,4-cis structural content. Likewise, chelates of the said metals have been used with monovalent bidentate or bivalent bidentate organic binders (U.S. Pat. Nos. 3,297,667 and No. 3,794,604), the preparation of structures of high 1,4 cis content also being emphasised in these cases.

In all described cases, in addition to the said metal compound, the catalytic system comprises an aluminium trialkyl or dialkyl monohydrate and a halogen ion added in the form of a Lewis acid.

As stated, the characteristic of the aforesaid processes is to provide 1,3-butadiene, isoprene or 1,3-pentadiene polymers or copolymers having a high content of 1,4-cis structural units. The use of the aforesaid catalysts is not however without drawbacks, such as the production of a polymer having a very low molecular weight (U.S. Pat. No. 3,641,188), or an excessively high molecular weight, if operating without an inert diluent, as described in the above patent application.

Furthermore, although the polymers prepared by the processes of the known art are soluble in certain hydrocarbon solvents, they are insoluble in the corresponding monomer in its liquid state. This latter fact is important if it is required to carry out the polymerisation in mass, i.e. in the absence of any added diluent.

It has now been found possible to provide a process for preparing conjugate diolefin polymers or copolymers which enables products having a high content of 1,4-cis units and high chain linearity to be obtained without any of the aforesaid drawbacks, by using a new catalytic system prepared from a compound of a metal chosen from those of Group III B of the Periodic System which have an atomic number of between 21 and 103, an organic halogen derivative and an aluminium alkylhydride or trialkyl.

A first subject matter of the present invention is therefore a new catalytic system prepared from
(1) at least one compound of a metal of Group III B of the Periodic System having an atomic number of between 21 and 103;
(2) an organic halogen derivative of formula

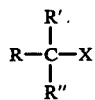

in which X is Cl or Br, R is H, alkyl, aryl, alkylaryl, chloro or bromo alkyl, alkoxy or epoxy; R' is alkyl, aryl, H, Cl or Br; R" is alkyl, aryl, chloro or bromo alkyl, chloro or bromo aryl, vinyl, Cl or Br; or R'+R" is oxygen, or saturated or unsaturated cycloalkyl. If R=R'=H, then R" is only of aromatic nature.

(3) an aluminum alkylhydride or trialkyl.

The metal derivative representing the first component can be any compound described in the literature, either of organic or inorganic nature.

Of all compounds, the applicant has found particular advantages in the use of neodymium derivatives which, in line with what has been stated, can be used either in their pure state or in association with other derivatives of other metals chosen from those heretofore defined for example praseodymium.

With regard to the compounds represented by the formula of the second component, the alkyl radicals can be either saturated or unsaturated, linear or branched, and contain from 1 to 18 carbon atoms.

Typical examples of organic halogen derivatives which can be used as catalytic components of the present invention are benzoyl, propionyl, benzyl, benzylidene or tertiary butyl chlorides or bromides, methyl chloroformate or bromoformate, chlorodiphenylmethane or chlorotriphenylmethane etc.

The third component of the catalytic system is constituted by one or more organometallic aluminum compounds which do not contain halide ions and are represented by the formula:

in which $R^a$ and $R^b$, which can be the same or different, are a hydrocarbon residue, preferably a saturated or unsaturated linear or branched alkyl, containing from 1 to 18 carbon atoms, and $R^c$ is hydrogen or an alkyl radical which can be the same as or different from $R^a$ or $R^b$.

The catalyst can be prepared either in the absence or in the presence of the monomer or the mixture of monomers to be polymerised. In both cases, it can be carried out either in the absence or in the presence of a hydrocarbon solvent chosen preferably from aliphatic or cycloaliphatic solvents or their mixtures.

The order in which the three components of the catalytic system are brought into contact is not important for the preparation kinetics or the successive polymerisation reaction. The prepared catalyst can also be allowed to age for a long period without undergoing any alteration.

The molar ratios of the three catalytic components are as follows: the molar ratio of the organic halogen derivative to the metal compound is greater than or equal to 0.33 and preferably between 0.5 and 3, and the molar ratio of the aluminum compound of the metal compound is greater than 20 and preferably between 30 and 200.

The use of an inert dilutent is not strictly necessary, it being possible to control the polymerisation even in the complete absence thereof. If it is preferred to use the diluent, this can be a hydrocarbon solvent, preferably aliphatic or cycloaliphatic.

The polymerisation temperature is not critical, and can therefore be chosen within a very wide range extending for example from 0° C. to 200° C. or beyond. It has no substantial influence on the characteristics of the polymer, except on its molecular weight and the distribution of the molecular weights, which vary in the same sense as the former. The monomer can be converted completely into the polymer in the absence of diluents.

One of the advantages of the process according to the invention is the stability of the organic halogen derivatives compared with metal halides, and thus their more simple use. Further advantages are that the temperature is not critical, and that even when operating in mass, conjugate diolefin polymers are obtained which have a high content of 1,4-cis units together with controlled molecular weights and a linear structure such as to make them perfectly soluble in even aliphatic hydrocarbons, and in the actual monomers themselves in the liquid state.

The technological, mechanical and elastic properties of the polymer products are excellent, even after curing, as the content of 1,4-cis units is always very high (greater than 98%) and the structure is perfectly linear.

The melting point of the polybutadiene is for example among the highest ever observed, ranging from $+3°$ to $+5°$ C. (measured at the peak of the DSC spectrum).

Monomers which can be polymerised by the described process include all conjugate, diolefins, particularly 1,3-butadiene, 1,3-pentadiene, and isoprene.

Copolymers of two or more of the aforesaid monomers are interesting because of their microstructure, which is essentially entirely of 1,4-cis type, and the statistical distribution of the monomer units.

The polymer does not require purification from the deactivated catalytic residues because of their small quantity and substantial inertia.

All operating details will be apparent from the examples given hereinafter as a non-limiting illustration of the invention.

EXAMPLE 1

A steel autoclave having a capacity of 2 liters and fitted with a stirrer and temperature regulator was exhausted by means of a mechanical vacuum pump, after which 500 g of anhydrous butadiene were fed in.

The autoclave was heated to an internal temperature of 80° C., after which 5 ml of a hexane solution in which 0.15 mmoles of $Nd(OC_4H_9)_3$, 7.5 mmoles of $Al(i.C_4H_9)_2H$ and 0.225 mmoles of benzoylchloride were dissolved, were immediately injected by means of a steel syringe under a pressure of nitrogen. The reaction mixture was kept at 80° C. under stirring for 90 minutes. The test was interrupted by introducing 2 ml of dilute ethanol in 50 ml of hexane.

The polymer mass was discharged from the autoclave and dried under vacuum at 50° C. to give 198 g of a dry product, of which 98.5% was found to be cis-polybutadiene on infra-red analysis. The intrinsic viscosity when measured in toluene at 30° was 5.15 dl/g.

EXAMPLE 2

1.5 ml of a hexane solution prepared by reacting for 15 mins $Nd(OC_4H_9)_3$ (0.054 mmoles), $Al(i.C_4H_9)_2H$ (2.7 mmoles) and tertiary butylchloride (0.081 mmoles) were fed under an inert atmosphere into a thick walled glass bottle of capacity 1 liter.

The bottle was closed with a crown cap and rubber gasket. 120 g of butadiene were fed through a bore in the cap from a cylinder fitted with a hypodermic needle, the mixture being kept stirred by means of a magnetically driven anchor stirrer. The reaction lasted for one hour, and took place in a bath temperature controlled at 30° C.

The polymer was recovered by venting off the excess butadiene and drying the residue under vacuum, to give 74 g. Mooney viscosity 72.5 ML(1+4,100°). Melting point (DSC)+3° C.

EXAMPLE 3

Using the same reactor described in example 1, the reactants stated therein were fed in with the exception of the benzoylchloride, which was replaced by an equal molar quantity of methyl chloroformate.

The reaction was carried out at 60° C. for 45 minutes. The polymer, when recovered and dried in the described manner, weighed 110 g and a microstructure containing 99% of 1,4-cis butadiene units.

EXAMPLE 4

130 ml of anhydrous hexane, 18.5 g of butadiene, and a hexane solution (2 ml) containing 0.032 mmoles of Nd-trinaphthenate, 0.048 mmoles of benzoylchloride and 1.6 mmoles of Al-diisobutylmonohydride were fed under a nitrogen atmosphere into a glass bottle of the type described in example 2.

The bottle was subjected to rotary movement in a water bath temperature controlled at 50° C. After 3 hours of reaction, the mixture was poured into an excess (0.5 liters) of ethanol. The polymer which coagulated was dried under vacuum at 50° C. to give 16.8 g in the dry state.

EXAMPLES 5 AND 6

Operating in the manner and with the quantities stated in example 4, analogous butadiene polymerisation tests were carried out in which the benzoylchloride was replaced by t-butylchloride and methyl chloroformate respectively.

The quantity of polymer after two hours of reaction were 17.3 g and 14.6 g in the two cases respectively.

EXAMPLE 7

Operating under the conditions and in the manner stated in example 4, a test was carried out using 130 ml of hexane, 0.032 mmoles of Nd-trinaphthenate, 1.6 mmoles of Al-triisobutyl, and 0.096 mmoles of benzylchloride.

The reaction proceeded for 120 minutes at a temperature of 50° C.

The polymer was coagulated and dried in the normal manner to give a weight of 12.1 g.

Infra-red analysis indicated a content of 1,4-cis butadiene units exceeding 99%.

EXAMPLES 8–10

Butadiene polymerisation tests were carried out operating in the manner described in example 7. The reactants and their quantities were as stated therein, with the exception that the benzylchloride was replaced by benzylbromide, benzotrichloride and allyl chloride respectively.

The polymerisation, carried out for 120 minutes at 50° C., gave respectively 4 g, 14.5 g and 9.4 g of polybutadiene in the order indicated.

EXAMPLE 11

A mixture of butadiene (400 g) and isoprene (150 ml) was fed into the autoclave described in example 1 in the manner indicated therein. The catalyst, added subsequently, was prepared separately by reacting together hexane solutions of $Nd(OC_4H_9)_3$ (0.04 M, 0.12 mmoles), $Al(i.C_4H_9)_2H$ (1.5 M, 6.0 mmoles), and tertiary butylchloride (0.1 M, 0.24 mmoles). The polymerisation was carried out at 60° C. for one hour under stirring, then interrupted with ethanol (2 ml).

The dried polymer weighed 165 g and on $^1$H-NMR analysis proved to be composed of 91% butadiene units and 9% isoprene units. The product had a melting point, determined by DSC, of −9° C., and an intrinsic viscosity, determined in toluene at 30° C., of 6.02 dl/g.

EXAMPLES 12–16

A set of five glass bottles of capacity 1 liter was used for polymerisation tests on butadiene in a hexane solution. They were fed as described in example 4, using the following quantities (for each bottle) in the order stated: hexane 130 ml, Nd(OC$_4$H$_9$) 0.032 mmoles (hexane solution 0.054 M), Al(i.C$_4$H$_9$)$_2$H 1.6 mmoles (hexane solution 0.876 M), organic chlorine derivative 0.096 mmoles (hexane solution 0.1 M), and butadiene 18.5 g.

The chlorine derivatives used in the individual tests were chlorotriphenylmethane, propionyl chloride, 2-chloro-propionyl chloride, benzylidene chloride, and chlorodiphenylmethane. As soon as the bottles were closed with a crown cap, they were placed in a water bath temperature controlled at 50° C. and simultaneously agitated.

After two hours, polymerisation was interrupted by venting the unreacted butadiene and introducing ethyl alcohol. The polymer which was recovered from each bottle after coagulation and drying gave the following weights (in the order stated heretofore): 17.8 g, 17.8 g, 13.8 g, 5.0 g, 17.8 g. All the polymers were perfectly soluble in hydrocarbons, and on infra-red analysis showed a content of 1,4-cis butadiene units exceeding 98%.

We claim:

1. A catalytic system for conjugate diolefin polymerization or copolymerization, prepared from
   (a) at least one carboxylate or alcoholate of a metal of Group IIIB of the Periodic System of elements having an atomic number of between 21 and 103;
   (b) an organic halogen derivative of the formula:

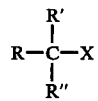

in which X is Cl or Br; R is H, alkyl, aryl, alkylaryl, chloro or bromo alkyl, alkoxy or epoxy; R' is alkyl, aryl, H, Cl or Br; R" is alkyl, aryl, vinyl, chloro or bromo alkyl; chloro or bromo aryl, Cl or Br; or R'+R" is oxygen, or saturated or unsaturated cycloalkyl; provided that if R=R'=H, then R" is only of aromatic nature.
   (c) organometallic aluminum compounds not containing halide ions, of the formula:

in which R$^a$ and R$^b$, which can be the same or different, are a saturated or unsaturated linear or branched alkyl residue containing from 1 to 18 carbon atoms, and R$^c$ is hydrogen or an alkyl radical which can be the same as or different from R$^a$ and R$^b$.

2. A catalyst system as claimed in the preceding claim, wherein component (a) is chosen from neodymium compounds or praseodymium compounds, or their mixtures.

3. A catalytic system for the polymerization of butadiene or isoprene or for the copolymerization of isoprene with butadiene, said catalytic system being obtained by contacting together the following components:
   (a) neodymium carboxylate or alcoholate
   (b) an organic halogenated compound selected from the group consisting of chlorides and bromides of alkyls, alkylenes, alkaryls, acyls, and chlorinated or brominated esters.
   (c) aluminum trialkyl or a dialkylaluminum hydride, the molar ratio of component b to component a being varied from 05:1 to 3:1; the molar ratio of component c to component a being varied from 30:1 to 200:1.

4. A catalytic system as claimed in claim 1, wherein the molar ratio of the organic halogen derivative to the Group III B metal compound is equal to or greater than 0.33.

5. A catalytic system as claimed in claim 1 wherein the molar ratio of the aluminum compound to the Group III B metal compound is equal to or greater than 20.

6. A catalytic system as claimed in claim 4, wherein the molar ratio of the organic halogen derivative to the Group III B metal compound varies between 0.5 and 3.

7. A catalytic system as claimed in claim 5, wherein the molar ratio of the aluminum compound to the Group III B metal compound varies between 30 and 200.

* * * * *